Patented Mar. 30, 1937

2,075,312

UNITED STATES PATENT OFFICE 2,075,312

PRODUCTION OF HALOGENATED ETHERS

Fritz Straus, Berlin, Germany, assignor to I. G. Farbenindustrie Aktiengesellschaft, Frankfort-on-the-Main, Germany No Drawing. Application April 3, 1935, Serial No. 14,437. In Germany April 10, 1934

8 Claims. (Cl. 260—151)

The present invention relates to the production of halogenated ethers.

I have found that halides of the general formula

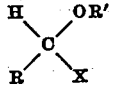

in which R stands for hydrogen, alkyl, aryl or aralkyl and R' for alkyl, aryl or aralkyl and X for halogen can be added on to compounds containing at least one olefinic double bond. It is not necessary to employ the said halides in isolated and pure form, but also mixtures of compounds capable of reacting like such halides, as for example mixtures of aldehydes with alcohols and hydrogen halides may be employed.

The reaction takes place with formation of halogenated ethers. Thus, for example, chlormethyl methyl ether reacts with trimethylethylene with formation of 1-methoxy-2.3-dimethyl-3-chlorbutane corresponding to the equation:

$$H_2C(OCH_3)Cl + CH_3 \cdot CH:C(CH_3)_2 \rightarrow$$
$$CH_3OCH_2 \cdot CH(CH_3) \cdot CCl(CH_3)_2$$

chlormethyl methyl ether reacts with butadiene with formation of 1-methoxy-5-chlor-pentene-3 corresponding to the equation:

$$H_2C(OCH_3)Cl + CH_2:CH \cdot CH:CH_2 \rightarrow$$
$$CH_3OCH_2CH_2CH:CH \cdot CH_2Cl$$

Halides suitable for the present process are for example chlormethyl methyl ether $$CH_2Cl(OCH_3),$$

chlor diethyl ether $CH_3CHCl(OC_2H_5)$, chlormethyl dodecyl ether $CH_2Cl(OC_{12}H_{25})$, alpha-chlor-didoceyl ether $C_{11}H_{23}CHCl(OC_{12}H_{25})$, alpha-chlorbenzyl methyl ether $C_6H_5CHCl(OCH_3)$ or its derivatives substituted in the nucleus, alpha-chlorcinnamic ethyl ether $$C_6H_5CH:CH \cdot CHCl(OC_2H_5)$$

or the corresponding brominated ethers. The mixtures of aldehydes with alcohols and halogen hydrides capable of reacting like the above named alpha halogen ethers may likewise be employed. Such mixtures are for example mixtures of paraformaldehyde with methanol and hydrogen chloride, of acetaldehyde with ethanol and hydrogen chloride, or formaldehyde with dodecyl alcohol and hydrogen chloride, and so on.

As compounds having an olefinic double bond suitable for the process may be mentioned for example cyclohexene, the homologues of ethylene, such as trimethylethylene, and further substances having conjugated double bonds as, for example, butadiene and its homologues, such as isoprene, and also 1.2-dihydrobenzene.

The reaction may be effected, if desired, in the presence of solvents, as for example benzene, and acetylenetetrachloride.

The speed of the reaction depends on the chemical nature of the unsaturated compound and the chloride employed. The reaction may be accelerated by adding catalysts, of which anhydrous metal halides, such as mercury chloride and zinc chloride, may be mentioned.

The reaction products thus obtained are suitable as solvents or may be employed as intermediates in the production of dyestuffs.

The following examples will further illustrate how my present invention may be carried out in practice, but the invention is not restricted to these examples. The parts are by weight if not indicated otherwise.

Example 1

16 parts of liquefied butadiene are caused to react with 52 parts of alpha-chlorbenzyl methyl ether, obtainable as described in Liebig's Annalen A. D. 1932, volume 493, page 203, in a pressure-tight vessel after adding as catalyst from about 0.3 to 0.7 part of mercuric chloride. The mixture is kept at room temperature for two days, after which time the reaction is practically finished.

The crude reaction product is shaken with an aqueous solution of sodium chloride and isolated therefrom by extracting with ether in the usual manner.

The 1-phenyl-1-methoxy-5-chlor-pentene-3 of the formula $$C_6H_5CH(OCH_3)CH_2 \cdot CH:CH \cdot CH_2Cl$$

thus obtained in an excellent yield is a colorless, viscous liquid smelling like acetal and boiling at 93° C. at a pressure of 0.01 mm. (mercury gauge) and having the specific gravity $$d\frac{20}{4}: 1.0657$$

Example 2

3 to 4 parts of mercuric chloride are added in a pressure-tight vessel to a mixture of 27 parts of chlor-methyl methyl ether with 10.5 parts of liquefied butadiene. When the mixture is warmed to room temperature, reaction takes place with evolution of heat, which is taken off by cooling with water. Thus the temperature is kept at about 30° C. for 24 hours.

The reaction product obtained in a yield of 60 to 70 per cent is 1-methoxy-5-chlor-pentene-3 of the formula $$CH_3OCH_2 \cdot CH_2CH:CH \cdot CH_2Cl$$

it can be isolated as described in Example 1. When purified by distillation it is an easily mobile liquid having a strong radish-like odor. It boils at 118° C. at normal pressure and has the specific gravity $$d\frac{20}{4}: 1.0022$$

Example 3

36 parts of crude alpha-chlorbenzyl methyl-ether obtained by reacting with acetylbromide on benzaldehyde-dimethyl acetal and removing the volatile by-products under reduced pressure as described in Liebig's Annalen A. D. 1932, volume 498, page 124, are added to 6 parts of liquefied butadiene, no catalyst being present. The reaction is finished after the mixture has been kept at room temperature for 3 days. The reaction product is 1-phenyl-1-methoxy-5-brompentene-3 of the formula $$C_6H_5 \cdot CH \cdot (OCH_3) \cdot CH_2 \cdot CH:CH \cdot CH_2Br$$

it is isolated with a yield of 30 per cent in the manner described in Example 1, and it boils at 92° C. at a pressure of 0.05 millimeter mercury gauge.

Example 4

27 parts of cyclohexene, 45 parts of alpha-chlorbenzyl methylether and 14 parts of mercuric chloride are mixed and stirred for 32 hours, no moisture being present. The mixture gradually darkens. The reaction proceeds substantially more slowly than the reaction of alpha-methoxy-benzylchloride and butadiene described in Example 1.

The unchanged cyclohexene is distilled off under reduced pressure. The reaction product is purified as described in Example 1 and dissolved in acetone and oxidized with potassium permanganate until permanganate is no longer discoloured.

1-methoxybenzyl-2-chlor-cyclohexane of the formula

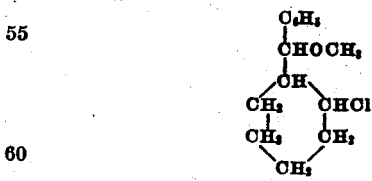

is thus obtained as a colorless liquid boiling at 94.5° C. at a pressure of 0.01 millimeter mercury gauge.

Example 5

Molecular proportions of 1.2-dihydro-benzene and alpha-methoxy-benzylchloride are mixed in the presence of some centigrams of mercuric chloride. The reaction takes place at room temperature with evolution of heat, which is taken off by cooling with water.

The reaction product is a-methoxy-benzyl-chlor-cyclohexene the structural formula of which is unknown. It boils at 112° C. at a pressure of 0.05 millimeter mercury gauge, the specific gravity being $$d\frac{20}{4}: 1.1066$$

The yield is almost quantitative.

If no catalyst is added the speed of the reaction is largely reduced and only 40 to 50 per cent of the mixture are reacted within 2 days.

If molecular proportions of chlormethyl methyl ether and 1,2-dihydrobenzene are reacted in the presence of some grams of mercuric chloride, methoxy-methyl-chlor-cyclohexene is formed with the evolution of heat. The said product boils at 81° C. at a pressure of 10 millimeters mercury gauge and has the following specific gravity $$d\frac{20}{4}: 1.0636$$

Example 6

30 cubic centimeters of liquefied butadiene are shaken for 3 days with a solution of 40 grams of benzaldehyde in 80 cubic centimeters of a 25 per cent solution of hydrogen chloride in methanol, 2 grams of mercuric chloride being added. The formerly colorless layer of the hydrocarbon is substantially increased and colored brown.

Unchanged butadiene is removed, the mixture washed with aqueous solutions of sodium chloride and sodium hydroxide and the reaction product 1-phenyl-1-methoxy-5-chlor-pentene-3, which is identical with the product described in Example 1 is purified by distillation.

Example 7

20 grams of dihydrobenzene are shaken for three days with a solution of 50 grams of benzaldehyde in 75 cubic centimeters of a 25 per cent solution of hydrogen chloride in methanol 2 grams of chloride being present. The reaction mixture forming two layers after short time is washed with aqueous solutions of sodium chloride and sodium hydroxide. The methoxy benzyl-chlor-cyclohexene formed boils at 113 to 114° C. at a pressure of 0.1 millimeter mercury gauge. It is identical with the product described in Example 5.

What I claim is:—

1. In the production of halogenated ethers the step which comprises reacting mixtures of aldehydes, alcohols and hydrogen halides capable of reacting like halides of the general formula:

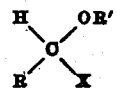

in which R stands for a substituent of the group consisting of hydrogen, alkyl, aralkyl or aryl, R' for a substituent of the group consisting of alkyl, aralkyl, or aryl and X for halogen with compounds containing at least one olefinic double bond.

2. In the production of halogenated ethers the step which comprises reacting mixtures of aldehydes, alcohols and hydrogen halides capable of reacting like halides of the general formula:

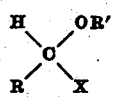

in which R stands for a substituent of the group consisting of hydrogen, alkyl, aralkyl or aryl, R' for a substituent of the group consisting of alkyl, aralkyl or aryl and X for halogen with compounds containing at least one olefinic double bond in the presence of a catalyst.

3. In the production of halogenated ethers the step which comprises reacting mixtures of aldehydes, alcohols and hydrogen halides capable of reacting like halides of the general formula:

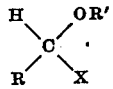

in which R stands for a substituent of the group consisting of hydrogen, alkyl, aralkyl or aryl, R' for a substituent of the group consisting of alkyl, aralkyl or aryl and X for halogen with compounds containing at least one olefinic double bond in the presence of a catalyst and of solvents.

4. In the production of halogenated ethers the step which comprises reacting mixtures of aldehydes, alcohols and hydrogen halides capable of reacting like halides of the general formula:

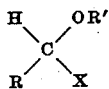

in which R stands for a substituent of the group consisting of hydrogen, alkyl, aralkyl or aryl, R' for a substituent of the group consisting of alkyl, aralkyl or aryl and X for halogen with compounds containing conjugated olefinic double bonds.

5. In the production of halogenated ethers the step which comprises reacting mixtures of aldehydes, alcohols and hydrogen halides capable of reacting like halides of the general formula:

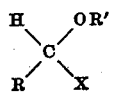

in which R stands for a substituent of the group consisting of hydrogen, alkyl, aralkyl or aryl, R' for a substituent of the group consisting of alkyl, aralkyl or aryl and X for halogen with butadiene.

6. The process for the production of halogenated ethers which comprises reacting a mixture of benzaldehyde, methanol and hydrogen chloride with butadiene.

7. In the production of halogenated ethers the step which comprises reacting mixtures of aldehydes, alcohols and hydrogen halides capable of reacting like halides of the general formula:

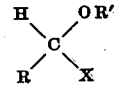

in which R stands for a substituent of the group consisting of hydrogen, alkyl, aralkyl or aryl, R' for a substituent of the group consisting of alkyl, aralkyl or aryl and X for halogen with trimethylethylene.

8. In the production of halogenated ethers the step which comprises reacting mixtures of aldehydes, alcohols and hydrogen halides capable of reacting like halides of the general formula:

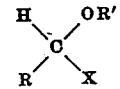

in which R stands for a substituent of the group consisting of hydrogen, alkyl, aralkyl or aryl, R' for a substituent of the group consisting of alkyl, aralkyl or aryl and X for halogen with cyclohexene.

FRITZ STRAUS.